June 2, 1931. F. H. HOPKINS 1,807,594
NONVIBRATING RELIEF VALVE
Filed Sept. 8, 1927
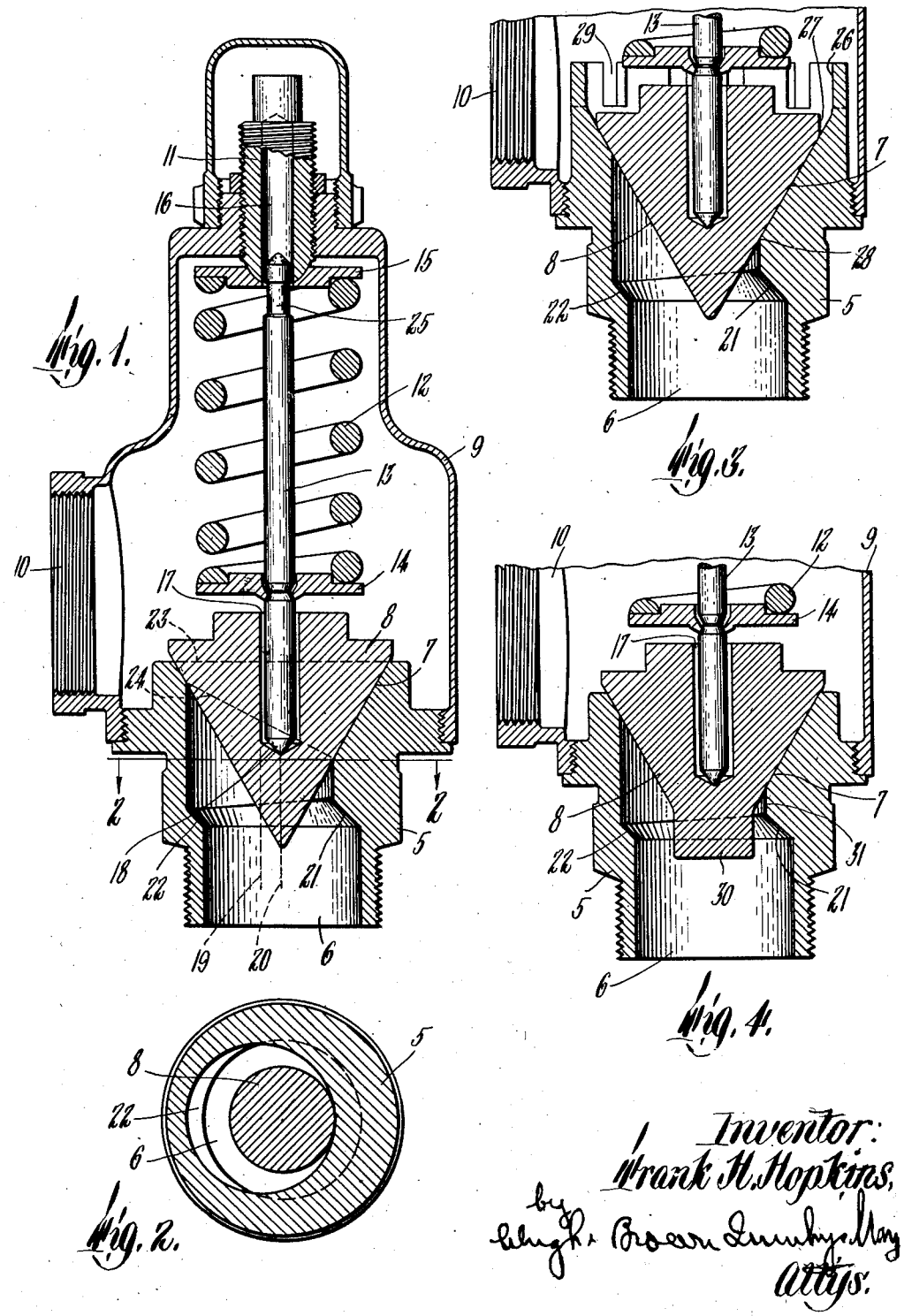

Patented June 2, 1931

1,807,594

UNITED STATES PATENT OFFICE

FRANK H. HOPKINS, OF ARLINGTON, MASSACHUSETTS, ASSIGNOR, BY MESNE ASSIGN-
MENTS, TO CONSOLIDATED ASHCROFT HANCOCK COMPANY, INC., OF NEW YORK,
N. Y., A CORPORATION OF DELAWARE

NONVIBRATING RELIEF VALVE

Application filed September 8, 1927. Serial No. 218,341.

The subject matter of this invention relates to relief or safety valves which are normally held closed by a spring and are adapted to open against the resistance of the spring for relief of pressure above the degree for which the spring is set. Such valves are used in various systems including pipes and containers holding steam, water, oil or other fluid under pressure. The particular construction of valve chosen for illustration herein is one of the class used with domestic heating systems in the line through which oil is passed.

Relief valves as heretofore made are subject to a serious objection, that is, of vibrating or fluttering and knocking when the valve proper leaves or approaches its seat or is held slightly open by escaping fluid under a pressure slightly more than the closing pressure of the valve spring. The noise caused by such vibration is objectionable in most installations, and is particularly so with valves used in domestic equipment. And with large valves, wherever used, this vibrating or fluttering sometimes causes a very loud and disagreeable noise and frequently injures the valve seat to such an extent as to destroy the accuracy of fit between the seat and valve proper.

My object is to obviate this objectionable vibration and noise in relief valves. I have accomplished this object by producing a valve in which the valve proper and its seat are so organized and related that the valve proper does not completely separate from its seat, but is always so guided and controlled by the seat that it cannot vibrate or flutter and make the objectionable noise or injure the seat. The invention is applicable to relief or safety valves of all sizes and capacities for use in all circumstances where such valves are applicable.

In the drawings,—

Fig. 1 is a vertical central section of one design of safety valve embodying the invention;

Fig. 2 is a cross section on line 2—2 of Fig. 1;

Figs. 3 and 4 are fragmentary sectional views, similar to Fig. 1, showing the valve proper and valve seat with different forms of means for limiting the lateral motion of the valve proper under extreme opening conditions.

Like reference characters designate the same parts wherever they occur in all the figures.

Referring first to Figs. 1 and 2, 5 represents the base fitting or casting adapted to be mounted on some part of the system in which fluid under pressure is confined, such fitting having a passage 6 for relief of the fluid when the pressure exceeds a predetermined degree, and having a seat 7 complemental to the valve proper 8. The valve further includes a casing 9 having an outlet 10, and supporting an adjustable abutment 11 for a spring 12 which acts through a stem 13 to force the valve proper to the seat. Such spring is confined between disks 14 and 15, the former being engaged with the stem and the latter reacting against the abutment 11, and the abutment having a passage 16 to guide the upper end of stem 13. The stem extends into a socket 17 in the valve proper and has a conical end 18 making point contact with the bottom of the socket in the axis of the valve below the upper end of the valve seat, and such socket is larger than the stem to permit of the valve proper finding its bearing on the seat.

As thus far described, the valve involves no substantial departure from prior practice; and modifications and variations from the precise structure shown may be made without departure from the invention claimed. Some sort of spring and an abutment therefor, or equivalent loading means are necessary.

The new step of the invention consists in making the valve seat eccentric to the adjacent part of the escape passage 6 in an amount, less than the width of the passage, such that the axis of the seat lies within the boundaries of the passage. The broken line 19 represents the axis of this part of the passage and the broken line 20 the axis of the valve seat and valve proper. The entrance end of the passage is preferably, but not necessarily offset to be concentric with the fitting 5 so as to avoid either putting an excessive weight of metal in the end of the fitting by which it is attached to the pressure containing system or making this end eccentric to the valve seat end, while at the same time making the escape passage of equal cross section throughout. These parts of the passage are readily constructed in practice by drilling longitudinally into opposite ends of the fitting on the lines 19 and 20, respectively. The conical pointed end of the drill forms the inclined connecting surfaces 21 and 22 in the course of the two drilling operations. The seating face 7 is formed with a continuous taper by drilling or reaming, or both, on the center line 20. Such taper is preferably straight as shown, although it may be somewhat curved longitudinally, with either concave or convex curvature, without departing from the principles and scope of the invention.

It results from this relationship between the passage and valve seat that the length of the valve seat, and equally of the seating face of the valve proper, varies from a minimum length at one side of the valve to a maximum length at the opposite side, as clearly shown in the drawings, the bearing area being bounded by the planes represented by the broken lines 23 and 24 in Fig. 1. Thus when the valve is seated, a greater area of the valve proper is exposed to the fluid pressure at one side of its axis than at the other. Hence the fluid pressure tends to force the valve laterally, and, when unseating the valve, moves it laterally as well as upwardly. The lateral movement is in the direction of the side where the seating area is longest. Such displacement of the valve proper also inclines the valve stem so that the pressure of the spring 12 is exerted toward the same side. Hence, as the valve proper lifts, it remains in contact with the long side of the seat and slides along the seat at this side. The socket 17 which receives the valve stem is made enough larger than the stem to avoid interference with the side of the stem when the valve is fully opened and the stem inclined to the maximum extent. Binding of the upper end of the stem in the guideway 16 at such times is prevented by making the end of the stem which enters the guideway with a loose fit and short bearing area, and providing a zone 25 of reduced diameter adjacent to the end.

The contact which is thus maintained with considerable force between the valve proper and one side of its seat when the valve is open, holds the valve proper steady and prevents it from fluttering or vibrating at any point in its opened or partially opened condition. The cause of fluttering in valves as heretofore made has been the necessary point engagement between the valve proper and stem, similar to that here shown, and the impossibility of preserving accurate balance of the valve proper and fluid pressure, at all sides of the axis of the stem. Even though the valves of the prior art are provided with guiding or steadying wings projecting into the passage of the valve seat fitting, it is impossible to fit such wings in the passage closely enough to prevent fluttering. There must be some freedom in the fitting of the wings in order that the valve may open and close at the prescribed pressures and adjust itself to the seat. Such unavoidable freedom or looseness is enough to permit the objectionable vibration and noise, as is well understood by all makers and users of relief valves.

I have overcome the difficulty by deliberately unbalancing the pressure area of the valve proper and causing the fluid pressure and seating spring to cooperate in maintaining a constant firm guiding engagement at all times between the valve proper and seat, discarding all means tending to center the valve proper when open and maintaining the valve proper perfectly steady by its contact with the seat.

Extensive tests under conditions which ordinarily cause very severe vibration have demonstrated that the valves made in accordance with this invention are free from this difficulty. They cause no vibration noise whether the valve proper is open only slightly or to any extent.

In the valve shown in Figs. 1 and 2, the lateral or transverse movement of the valve proper continues in a regularly increasing degree throughout the opening movement, and its pressure against the valve seat is increased in greater ratio due to the increasing angularity of the stem 13. This is unobjectionable in many instances, but in others may be objectionable. To avoid any objection from this cause, I have devised means for limiting the lateral movement of the valve proper while retaining the advantages due to the eccentric relation of the valve proper to the seat and the guiding engagement between them. One form of such means is shown in Fig. 3 and consists in providing an upstanding lug 26 at the upper end of the valve seat adapted to be engaged by the large end of the valve proper after the latter has been displaced laterally to a limited extent. Opening movement of the valve is then continued along the line of the lug, without further lateral displacement, but contact of the valve proper and the seat fitting is still maintained between the part 27 of the valve proper and lug 26 at one end, and between the lower extremity 28 of the valve seat and the adjacent part of the valve proper. Contact at these points is sufficient to accomplish the results previously described.

Although I have shown here a series of lugs 26 with intermediate spaces 29 to permit escape of the fluid, completely surrounding the valve proper, this arrangement is provided for convenience of manufacture, and only the lug at the side where the seating face has its greatest length is necessary for the purpose of a guide.

An alternative means for the same purpose is shown in Fig. 4 and consists in an extension 30 of the valve proper adapted to engage the part 31 of the valve seat fitting adjacent to the lower end of the longest part of the seat when the valve proper has been displaced laterally to the prescribed limited distance. Other equivalent alternatives may be employed for the same purpose, as by forming the valve seat with a spherical or spheroidal concave curvature, which would give the valve proper the same character of movement as the guide means shown in Fig. 3.

In the foregoing specification I have described the valve and the relation of its several parts on the assumption that it is in a vertical position, as here shown. Such description, however, is not to be construed as a limitation in the uses or applications of the invention, since these principles may be applied to a valve used in any situation, as well when the valve proper opens in a lateral or downward direction as when the opening movement is upward. The descriptive terms hereinbefore used are to be construed in accordance with this explanation.

What I claim and desire to secure by Letters Patents is:

1. A relief valve comprising a fitting having a fluid passage and a tapering valve seat at one end of said passage eccentric thereto by an amount, less than the width thereof, such that the axis of the seat lies within the boundaries of the passage, combined with a loaded valve proper complemental to said seat.

2. A relief valve comprising a seat fitting having a tapered valve seat, a valve proper complementally tapered to fit said seat and project therein, loading means for the valve proper having a rocking engagement therewith and being free to apply closing load on the valve proper in a direction inclined to the axis of the seat, and an escape passage for pressure fluid intersecting the valve seat and being eccentric to the seat and valve proper.

3. A relief valve comprising a fitting having an escape passage and a tapered valve seat constituting one end of such passage and arranged eccentric to the adjacent part of the passage, a valve proper complemental to said seat extending into the passage, and means for applying seating force to said valve centrally thereof and of the valve seat.

4. A relief valve comprising complemental valve and seat members and means for causing the fluid pressure to exert unequal pressures on different sides of the axis of the members, said members having inclined guiding elements arranged to maintain contact with one another at longitudinal separate points when the valve is open, whereby vibration of the valve is prevented.

5. A relief valve comprising a fitting having a tapered valve seat at one end and a passage intersecting said seat eccentrically thereto, a valve proper complemental to said seat and concentric therewith, having an extended bearing portion in engagement with the longer side of the seat, and means for applying seating force to said valve proper.

6. A relief valve comprising a fitting having a tapered valve seat at one end and a passage intersecting said seat eccentrically thereto, a valve proper complemental to said seat and concentric therewith, having an extended bearing portion in engagement with the longer side of the seat, a seating spring for the valve proper, and a stem for applying the force of said spring engaged flexibly with the valve proper to permit lateral movement thereof in opening and closing.

7. A relief valve comprising a fitting having a tapered valve seat at one end and a passage intersecting said seat eccentrically thereto, a valve proper complemental to said seat and concentric therewith, having an extended bearing portion in engagement with the longer side of the seat, a stem flexibly engaged with the valve proper, a guide for a part of said stem distant from the valve proper arranged to guide such part of the stem in a given line while permitting deflection thereof with the valve proper, and a spring arranged to apply seating force through the stem on the valve proper.

In testimony whereof I have affixed my signature.

FRANK H. HOPKINS.